March 7, 1950     T. N. HUBBUCH ET AL     2,499,385
METHOD FOR DEFLUORINATING PHOSPHATE ROCK
Filed Nov. 29, 1947
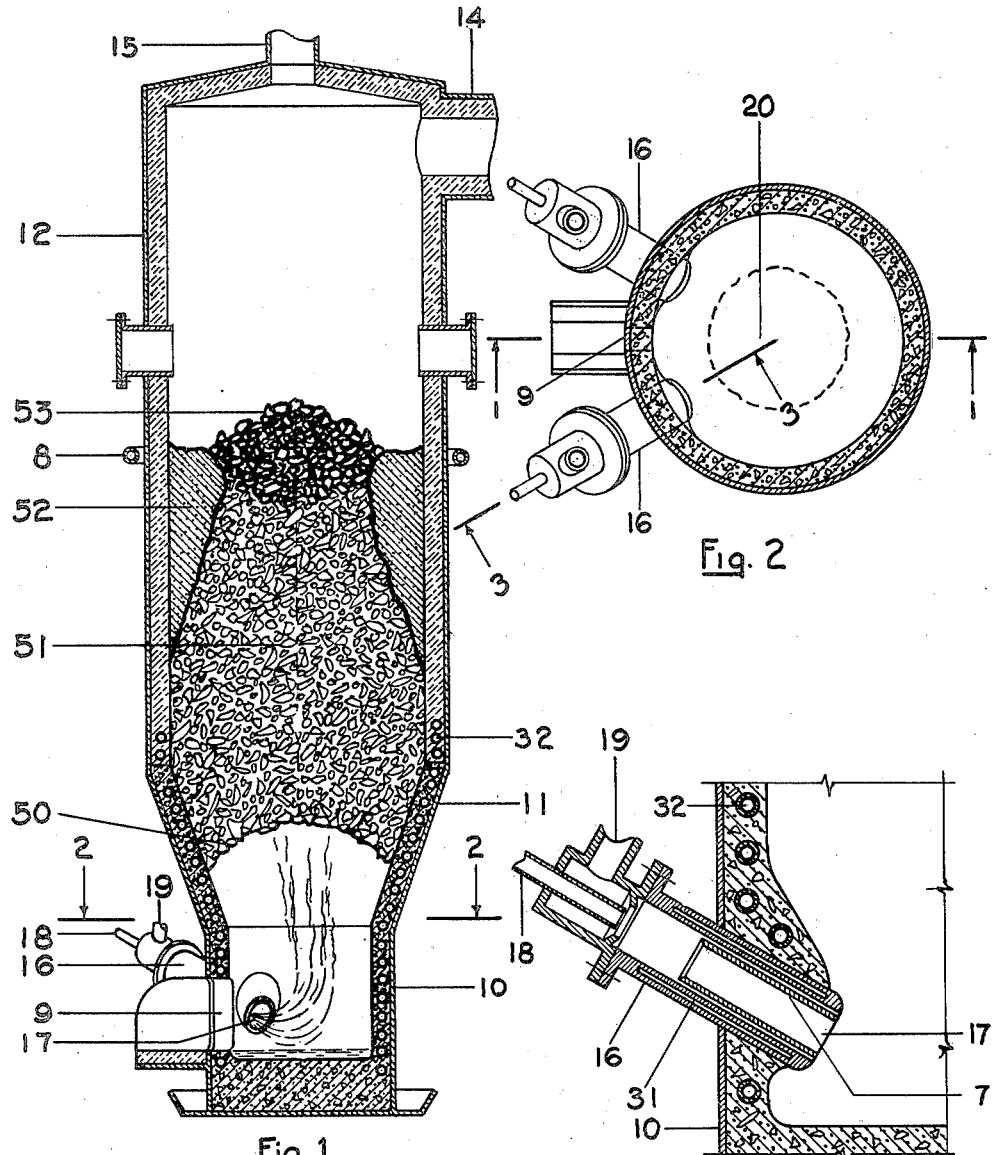
INVENTOR.
Theodore N. Hubbuch
and
Travis P. Hignett
BY Bentley C. Morrow
ATTORNEY.

Patented Mar. 7, 1950

2,499,385

UNITED STATES PATENT OFFICE 2,499,385

METHOD FOR DEFLUORINATING PHOSPHATE ROCK

Theodore N. Hubbuch, Knoxville, Tenn., and Travis P. Hignett, Sheffield, Ala., assignors to Tennessee Valley Authority, a corporation of the United States Application November 29, 1947, Serial No. 788,928

4 Claims. (Cl. 23—108)

(Granted under the act of March 3, 1883, as amended April 30, 1928; 370 O. G. 757)

The invention herein described may be manufactured and used by or for the Government for governmental purposes without the payment to us of any royalty therefor.

This invention relates to methods and apparatus for volatilizing fluorine from phosphate rock.

The fluorine in phosphate rock has long been known to be present chiefly in a chemical compound called fluorapatite, $Ca_{10}F_2(PO_4)_6$. This fluorapatite structure is well-known to be responsible for the low availability of the phosphate for plant food. In the manufacture of phosphate fertilizers various methods for breaking up the fluorapatite structure have been used and these may be divided into two broad classes; namely those which destroy the fluorapatite configuration and leave the greater part of the fluorine in the product in the form of simple fluorides, and those which yield a product which is very low in or substantially free from fluorine. It is to this latter class that this invention relates.

It has been shown by Marshall et al., Ind. Chem. Eng. 27, 205-9 (1935), that fluorine can be volatilized from phosphate rock by heating the rock in the presence of silica and water vapor. The principal reaction is, presumably,

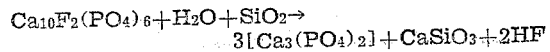
$$Ca_{10}F_2(PO_4)_6 + H_2O + SiO_2 \rightarrow 3[Ca_3(PO_4)_2] + CaSiO_3 + 2HF$$

although numerous side reactions also occur. This article states that from the point of view of the economics of production, methods for defluorinating phosphate rock by volatilizing fluorine in the presence of silica and water vapor are unsatisfactory. With low consumption of steam, low output is obtained; with high consumption of steam, these methods require so much heat as to be too expensive.

Rather complete removal of fluorine from rock phosphate has long been known to be necessary in order to convert the rock into tricalcium phosphate wherein the phosphate is readily available for plant food. MacIntire et al., Soil Science 57, 423-44 (1944) have shown that for effective fertilizer use the fluorine content of the phosphate fertilizer should not be greater than 0.4 per cent. Other investigators have found that tricalcium phosphate containing 0.6 per cent of fluorine is an effective fertilizer. The upper limit of fluorine permissible in phosphate fertilizer is, therefore, somewhat vague, but it is known that the fluorine content should be as low as is practical to obtain and should not exceed 0.6 per cent.

Attempts have been made to develop commercial processes based on the equation given above. U. S. Patent 2,220,575, issued November 5, 1940, has shown a method and apparatus for the defluorination of phosphate rock by this principle. It teaches melting the phosphate rock and silica in a chamber lined with silicon carbide, sintered corundum and chromite or other very highly refractory and corrosion resistant material, followed by flowing a thin layer of the melt over the floor of an adjacent chamber of similar construction in intimate contact with a stream of hot gases containing water vapor. No commercial installations embodying these teachings are in operation because of the high cost of construction of furnaces necessary to carry out this type of operation, the unavoidable waste of heat through the furnace walls, operational difficulties in maintaining even flow of a sufficiently thin layer of melt in contact with hot gases containing water vapor, and excessive destruction of high-priced refractories by the extremely corrosive materials being handled. Phosphate fertilizer is an extremely cheap material and its selling price cannot support high manufacturing costs.

Methods employing rotary and reverbatory furnaces have also been suggested. These have one or more of the disadvantages of requiring expensive equipment, resulting in incomplete defluorination and/or difficult operation.

Vertical shaft furnaces have long been known to be relatively cheap to construct and operate. The use of a vertical shaft furnace to carry out defluorination of phosphate in the presence of silica and water vapor has been suggested, but has been considered to be impossible. British Patent 487,119, issued June 15, 1938, states that it is not possible to conduct defluorination of phosphate rock in such a furnace in continuous operation and teaches a method for defluorination which comprises melting the rock and silica and exposing the resulting molten material in a layer less than one inch thick to the action of hot gases and water vapor. The method taught also requires the use of very expensive, highly refractory and corrosion resistant linings and does not efficiently utilize the applied heat.

U. S. Patent 2,474,831, issued to Elmore, teaches a method for defluorinating phosphate rock in a vertical shaft furnace. This method or process is operable with varying degrees of efficiency in furnaces of many designs, but we have found that, in order to obtain a very high degree of efficiency, the process taught by Elmore should be carried out in a furnace of a special type, operated in a special manner.

It is an object of this invention to provide an improved furnace for defluorinating phosphate rock and an improved method for operating the same.

Another object is to provide an improved method for defluorinating phosphate rock in which a very high degree of efficiency is attained.

Other objects and advantages will become apparent as this disclosure proceeds.

*General statement*

We have now found that these objects may be attained by providing a vertical shaft furnace comprising a hearth portion surmounted by a tapered bosh which is in turn surmounted by a vertical shaft; a plurality of, and preferably two, burner ports, communicating with the interior of the hearth portion and sloping downward toward a central part of the furnace hearth at an angle of from about 10° to 30°; and fluid hydrocarbon fuel burner, comprising an inlet for fluid hydrocarbon fuel adjacent to an inlet for compressed air, disposed in each of said burner ports adapted to blast a mixture of fluid fuel and air downward at an angle of about 10° to 30° at a central part of the furnace hearth at a velocity greater than the supposed velocity of propagation of flame in air-hydrocarbon mixtures published in the literature; providing a furnace charge containing phosphate rock and silica wherein the silica content is preferably in the range from about 18 to 25 per cent; introducing this charge into the furnace in the form of discrete lumps or masses until the furnace is filled to a depth of at least ten feet and preferably from 13 to 18 feet or more above the hearth; continuously introducing a blast of burning hydrocarbon fuel and air from said burners through said burner ports downward at an angle from about 10° to about 30° toward a central part of the hearth of the furnace from which the greater portion of the resulting hot combustion gases is deflected substantially vertically upward; collecting the resulting defluorinated tricalcium phosphate in the hearth of the furnace after it has trickled down over unmelted masses of charge in intimate contact with hot combustion gases containing water vapor; at intervals withdrawing molten tricalcium phosphate from the hearth of the furnace; and at intervals adding fresh portions of charge to an upper part of the body of charge in the furnace.

*Drawings*

The attached drawings show diagrammatically a vertical shaft furnace embodying principles of our invention and in which the method of our invention can be carried out. Fig. 1 is a vertical section of such a furnace. Fig. 2 is a cross section through the hearth portion of this furnace on the line 2—2, and shows the general arrangement of the hearth portion and burner ports. Fig. 3 is a partial cross section of the hearth portion of the furnace on the line 3—3 and shows relationship of burners, burner ports and furnace hearth. Like reference numerals apply to like parts in all figures.

Referring to Fig. 1, reference numeral 10 indicates a hearth portion of a vertical shaft furnace adapted to hold a pool of molten material and having a taphole 9. Hearth 10 is surmounted by a tapered bosh 11 which is in turn surmounted by a vertical shaft 12, having an outlet 14 for waste gases and an inlet 15 for solid furnace charge. For best results the cross sectional area of shaft 12 should be not less than about 1.75 times the cross sectional area of portion 10, i. e., the area of the hearth should be not more than 57 per cent of that of the shaft. A plurality of, preferably two, burner ports 16 are disposed in the walls of the hearth portion 10 and communicate with the interior of the hearth. These preferably slope downward from the horizontal at an angle of from 10° to 30°, and are pointed toward a central area 20 (shown in Fig. 2) of the hearth floor. When two burner ports are used, they should be located on opposite sides of taphole 9 and should be as near taphole 9 as good construction strength will permit and should be located at a distance from each other on the circumference of the hearth which does not exceed 90° of arc. These burner ports may be nozzle shaped or cylindrical as shown, but their internal volume must be small enough to prevent much combustion of fuel in the ports while large enough to initiate combustion and they must communicate with the interior of hearth 10 through an opening 17 small enough to insure the velocity of air and fuel hereinafter described. An oil burner comprising an inlet 18 for hydrocarbon fuel oil and an inlet 19 for air under pressure is disposed in each burner port 16.

Fig. 2 shows a preferred arrangement of two burners 16 disposed on opposite sides of taphole 9. These are illustrated in radial arrangement both pointing at the same spot at about the center of the hearth. However, it is not necessary to use this radial arrangement as we have had equally good results with a tangential arrangement of burner ports, i. e., with one burner parallel to a hearth diameter drawn through taphole 9 and the other burner perpendicular to the same diameter but with both pointing downward at central area 20. One, three or four burners may be used instead of two, if desired, but the efficiency of the furnace is considerably reduced by doing so.

Fig. 3 shows the burner, burner port and adjacent cooperating parts of hearth 10 in greater detail. The burner port is shown surrounded by a cooling water jacket. Cooling water coils 22 are also shown embedded in a poured refractory lining of hearth 10. These are disposed in the sides of hearth 10 and in the walls of bosh 11, as shown in Fig. 1. Suitable plates or other means for internally cooling the walls of the hearth and bosh may be substituted for coils 32 if desired. The hearth floor, walls and bosh may be lined with a cheap poured refractory, such as cement composed of about 40 per cent alumina, 40 per cent lime, 15 per cent iron oxide and 5 per cent silica, and magnesia suitably mixed with fire brick grog. The furnace shaft may preferably be lined with ordinary cheap commercial fire brick. A refractory sleeve 7 is preferably disposed in each burner port as shown.

*Operation*

We prefer to begin operation by introducing a fluid hydrocarbon fuel of one of the usual commercial grades through inlet 18, igniting the fuel and introducing air under pressure via inlet 19. The furnace is then rapidly filled with a charge of phosphate rock and silica in which the silica is present in excess of 15 per cent and preferably to the extent of from 18 to 25 per cent. This charge is introduced as discrete lumps or masses of not less than one-fourth inch average diameter and the furnace is filled with these to a depth of at least 10 feet, and preferably from 13 to 18 feet above the hearth. The relative rates of admission of fuel and air are adjusted to maintain good combustion conditions. We prefer to use approximately 97 per cent of the air theoretically required for perfect combustion as we have found that greatest efficiency is attained when the ratio of air to fuel is a little below the theoretical requirement.

A stream of air and burning oil droplets is blasted through opening 17 from the burner port into the hearth portion of the furnace at a linear velocity in the range of 30 to 120 feet per second and preferably in the range from 50 to 110 feet per second. This velocity is far in excess of the rate of propagation of flame in hydrocarbon fuel-air mixtures as calculated from data found in "Fuels and Their Combustion" by Haslam and Russell, McGraw-Hill, (1926), pp. 266-277, and in "Gas Engineer's Handbook" prepared by Gas Engineer's Handbook Committee of the The Pacific Coast Gas Association, McGraw-Hill (1934) pp. 196-199. From data found there it can be calculated that the velocity of propagation of flame in such mixtures is approximately 10 feet per second, or about one-third to one-twelfth of the velocity with which we have found it desirable to introduce the oil-air mixture.

We have found that a high linear velocity of the burning oil-air mixture is very important in obtaining maximum efficiency in the operation of this process. In operating in this manner, the burner ports serve as loci for initiating combustion, but little combustion occurs in these ports. The velocity of the stream carries the burning fuel and air into a central part of the furnace hearth where the combustion and heat are concentrated. The downward slope of the burner ports is adapted to cause the stream of burning fuel and air to impinge upon the floor of the hearth or upon a pool of molten material with which the floor of the hearth soon becomes covered and prevents concentration of heat against the furnace wall opposite to the burner ports. The refractory sleeve 7 serves as an igniter for the fuel-air mixture. A refractory material is used so that a temperature high enough to cause ignition can be maintained without excessive deterioration of the burner wall.

This type of combustion may be roughly compared to that frequently observed in an ordinary Bunsen burner in which gases leave the top of the burner at a velocity so great that the flame becomes separated from the burner top and combustion occurs principally at or near some object placed in the path of the gases. Such combustion is frequently regarded as highly undesirable.

However, we have found that the introduction of the stream of burning fuel and air at a velocity of about 30 to 120 feet per second greatly increases the efficiency of the furnace in this process. The angle of burner ports with respect to the substantially horizontal floor of the hearth, the location of burner ports with respect to the taphole, the velocity of introduction of the stream of burning fuel oil and air, the ratio of hearth area to shaft area, and the ratio of hearth area to oil combustion all cooperate to give maximum efficiency in this process.

Concentrated combustion of fuel in the hearth portion results in melting the charge in the hearth of the furnace and the formation of a rough arch 50, shown in Fig. 1, in the bottom of the charge in the bosh. Cooling water from line 8 may be flowed down the outer surface of shaft 12 to insure that the portions of the charge adjacent to the walls of shaft 12 are at lower temperature than in the more central parts of the charge. The substantially vertical upward flow of gases resulting from combustion under these conditions results in the gases passing upward through the more central parts of the charge at a much greater rate of flow than the rate of flow through those portions of the charge adjacent to the walls of shaft 12.

This results in the formation of a central portion of charge 51 in which the individual masses slowly melt. Because of the less vigorous heating near the walls of shaft 12, a ring of sintered charge 52 is formed surrounding the upper part of the charge. This adheres to the walls of shaft 12. From time to time the melting charge in the central portion 51 sinks or collapses to leave a sunken "chimney" shown filled with a fresh portion of charge 53.

The greater portion of melting occurs on the surface of arch 50 and in that part of the charge extending vertically upward through the central part of the furnace. The individual masses of charge melt on their surfaces exposed to contact with the hot combustion gases without softening in their interiors sufficiently to permit the whole body of charge to settle under its own weight and close off passages for gas through the body of the charge.

Molten material resulting from surface melting of the individual masses trickles down over lower portions of the charge in intimate countercurrent contact with the hot combustion gases and since these result from burning hydrocarbon fuel and therefore contain about 12 per cent or more of water vapor the molten material is effectively defluorinated.

The molten material need descend only a few feet in contact with the hot combustion gases for the greater part of its fluorine content to be transformed into volatile compounds and to be vaporized from the melt. While we prefer to use a depth of charge of at least 10 feet and preferably from 13 to 18 feet, this preference is based on the time of contact of hot gases with the charge necessary to effect economical transfer of heat from the gases to the charge.

The molten material after trickling down over portions of the charge accumulates in the hearth of the furnace. At intervals this is withdrawn via taphole 9. This product is an impure tricalcium phosphate in which the fluorine may be consistently below 0.6 per cent and is often from about 0.1 per cent to about 0.3 per cent.

At intervals when the upper central portion of the charge sinks or collapses to form a "chimney," a fresh portion of charge is added. The process is thus made continuous.

*Example I*

A furnace was constructed substantially as described above except that it had only one burner port and this was of conical shape with the large end of the cone forming the opening into the hearth of the furnace. A stream of burning fuel oil and air was passed through this burner port into the hearth at low velocity. The furnace was charged as described above and the heating was continued.

The flame soon melted a narrow channel up through the body of the charge while the great body of the charge and the hearth portion of the furnace remained relatively cool, irrespective of the rate at which oil was burned. Molten material was formed in the narrow passage cut by the flame and much of it was blown out of the furnace. Heat transfer was very poor. Molten material forming in the passage showed a strong tendency to flood into and solidify in burner ports. Tapping was very difficult because of unmelted charge present in the furnace hearth.

Operation with a single burner port was discontinued and the furnace was equipped with two and then with three burner ports.

Under similar conditions of operation a plurality of burners resulted in melting a plurality of channels through the bed of charge. Only occasionally did these enlarge and merge to give good efficiency in operation.

*Example II*

A furnace was constructed substantially similar to that used in Fig. 1, except that it had four small burner ports sloping downward at an angle of 30° and pointing toward a central part of the floor of the hearth. The openings by means of which the ports communicated with the hearth were of a size to permit a linear velocity of about 60 feet per second with the rate of introduction of oil and air that was described. The furnace was operated as described using four burner ports, and high velocity of fuel-air streams.

Later two of these were closed off and two ports located on opposite sides of the taphole at a distance from each other of 90° on the circumference of the hearth were used. Difficulties in operation were greatly decreased. The charge in the hearth melted to give a good arch in the bosh.

Comparative data were:

|  | 2 burner ports | 4 burner ports |
| --- | --- | --- |
| Total Oil Rate, gal./hr | 168.2 | 168.1 |
| Production Rate, tons/24 hr | 86.7 | 66.1 |
| Oil Consumption, gal./ton of product | 46.6 | 61.0 |
| Fluorine in Product, per cent | 0.34 | 0.34 |

We claim:

1. In a process for defluorinating phosphate rock wherein a charge consisting of phosphate rock and silica in which the proportion of silica is in excess of that required to satisfy the equation $$CA_{10}F_2(PO_4)_6 + H_2O + SiO_2 \rightarrow 3[CA_3(PO_4)_2] + CASiO_3 + 2HF$$

is introduced into a vertical shaft furnace in discrete masses, a stream of hot combustion gases containing not less than 4 per cent water vapor is continuously passed upward against the bottom of the charge, the hot combustion gases are passed upward through the central parts of the charge at substantially greater rate of flow than the rate of flow of said gases through those parts of the charge adjacent to the walls of the furnace so that the charge forms a sintered ring surrounding a central melting zone, resulting defluorinated molted material is withdrawn from from a lower part of the furnace and fresh portions of charge are added to an upper part of the body of charge at intervals, that improvement which comprises continuously introducing a plurality of streams, comprising burning hydrocarbon fuel in admixture with air, into a lower part of the furnace at a velocity of from about 30 to about 120 feet per second in a direction downward at an angle of from 10 degrees to 30 degrees from the horizontal to a central part of the bottom of the furnace; melting a lower part of the charge to form an arch delimiting the bottom of the body of charge; and continuously deflecting the resulting hot combustion gases upward against said arch and through said body of charge.

2. In a process for defluorinating phosphate rock wherein a charge consisting of phosphate rock and silica in which the proportion of silica is in excess of that required to satisfy the equation $$Ca_{10}F_2(PO_4)_6 + H_2O + SiO_2 \rightarrow 3[Ca_3(PO_4)_2] + CaSiO_3 + 2HF$$

is introduced into a vertical shaft furnace in discrete masses, a stream of hot combustion gases containing not less than 4 per cent water vapor is continuously passed upward against the bottom of the charge, the hot combustion gases are passed upward through the central parts of the charge at substantially greater rate of flow than the rate of flow of said gases through those parts of the charge adjacent to the walls of the furnace so that the charge forms a sintered ring surrounding a central melting zone, resulting defluorinated molten material is withdrawn from a lower part of the furnace and fresh portions of charge are added to an upper part of the body of charge at intervals, that improvement which comprises continuously introducing two streams, comprising burning hydrocarbon fuel in admixture with air, into a lower part of the furnace at a velocity of from about 50 to about 100 feet per second at an angle of not more than 90 degrees to each other in a direction downward at an angle of from 10 degrees to 30 degrees from the horizontal to a central part of the bottom of the furnace; melting a lower part of the charge to form an arch delimiting the bottom of the body of charge; and continuously deflecting the resulting hot combustion gases upward against said arch and through said body of charge.

3. In a process for defluorinating phosphate rock wherein a charge consisting of phosphate rock and silica in which the proportion of silica is in excess of that required to satisfy the equation $$Ca_{10}F_2(PO_4)_6 + H_2O + SiO_2 \rightarrow 3[Ca_3(PO_4)_2] + CaSiO_3 + 2HF$$

is introduced into a vertical shaft furnace in discrete masses, a stream of hot combustion gases containing not less than 4 per cent water vapor is continuously passed upward against the bottom of the charge, the hot combustion gases are passed upward through the central parts of the charge at substantially greater rate of flow than the rate of flow of said gases through those parts of the charge adjacent to the walls of the furnace so that the charge forms a sintered ring surrounding a central melting zone, resulting defluorinated molten material is withdrawn from a lower part of the furnace and fresh portions of charge are added to an upper part of the body of charge an intervals, that improvement which comprises continuously introducing two streams, comprising burning hydrocarbon fuel in admixture with air in such proportion that there is present about 95 per cent to 100 per cent of the quantity of air required for complete combustion, into a lower part of the furnace at a velocity of from about 30 to about 120 feet per second, at an angle of not more than 90 degrees to each other in a direction downward at an angle of from 10 degrees to 30 degrees from the horizontal to a central part of the bottom of the furnace; melting a lower part of the charge to form an arch delimiting the bottom of the body of charge; and continuously deflecting the resulting hot combustion gases upward against said arch and through said body of charge.

4. In a process for defluorinating phosphate rock wherein a charge consisting of phosphate rock and silica in which the proportion of silica is in excess of that required to satisfy the equation

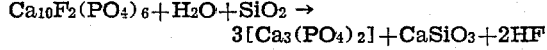
$$Ca_{10}F_2(PO_4)_6 + H_2O + SiO_2 \rightarrow$$
$$3[Ca_3(PO_4)_2] + CaSiO_3 + 2HF$$

is introduced into a vertical shaft furnace in discrete masses, a stream of hot combustion gases containing not less than 4 per cent water vapor is continuously passed upward against the bottom of the charge and the hot combustion gases are passed upward through the central parts of the charge at substantially greater rate of flow than the rate of flow of said gases through those parts of the charge adjacent to the walls of the furnace so that the charge forms a sintered ring surrounding a central melting zone, resulting defluorinated molten material is withdrawn from a lower part of the furnace and fresh portions of charge are added to an upper part of the body of charge at intervals, that improvement which comprises continuously introducing two streams, comprising burning hydrocarbon fuel in admixture with air in such proportion that there is present about 95 per cent to 100 per cent of the quantity of air required for complete combustion, into a lower part of the furnace at a velocity of about 60 feet per second, at an angle of not more than 90 degrees to each other in a direction downward at an angle of from 10 degrees to 30 degrees from the horizontal to a central part of the bottom of the furnace; melting a lower part of the charge to form an arch delimiting the bottom of the body of charge; and continuously deflecting the resulting hot combustion gases upward against said arch and through said body of charge.

THEODORE N. HUBBUCH.
TRAVIS P. HIGNETT.

REFERENCES CITED

The following references are of record in the file of this patent:

UNITED STATES PATENTS

| Number | Name | Date |
| --- | --- | --- |
| 502,482 | Dauber | Aug. 1, 1893 |
| 936,781 | Kemp | Oct. 12, 1909 |
| 1,260,660 | Gehrandt | Mar. 26, 1918 |
| 1,411,696 | Haege | Apr. 4, 1922 |
| 1,803,417 | Walton | May 5, 1931 |
| 2,189,248 | Luscher | Feb. 6, 1940 |
| 2,220,575 | Luscher | Nov. 5, 1940 |
| 2,395,231 | McNeil | Feb. 19, 1946 |

Certificate of Correction

Patent No. 2,499,385                                                         March 7, 1950

THEODORE N. HUBBUCH ET AL.

It is hereby certified that errors appear in the printed specification of the above numbered patent requiring correction as follows:

Column 7, lines 55 and 56, for $$CA_{10}F_2(PO_4)_6 + H_2O + SiO_2 \rightarrow 3[CA_3(PO_4)_2] + CASiO_3 + 2HF$$

read $$Ca_{10}F_2(PO_4)_6 + H_2O + SiO_2 \rightarrow 3[Ca_3(PO_4)_2] + CaSiO_3 + 2HF$$

line 68, for the word "molted" read *molten*; line 69, strike out "from"; column 8, line 11, for "whereing" read *wherein*;

and that the said Letters Patent should be read with these corrections therein that the same may conform to the record of the case in the Patent Office.

Signed and sealed this 13th day of June, A. D. 1950.

[SEAL]

THOMAS F. MURPHY,
*Assistant Commissioner of Patents.*